United States Patent
Conboy et al.

(10) Patent No.: US 6,338,005 B1
(45) Date of Patent: Jan. 8, 2002

(54) MANAGING TEST MATERIAL IN AN AUTOMATED MATERIAL HANDLING SYSTEM

(75) Inventors: Michael R. Conboy, Austin, TX (US); Patrick J. Ryan, Eugene, OR (US); Elfido Coss, Jr., Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/387,613

(22) Filed: Aug. 31, 1999

(51) Int. Cl.[7] .................................................. G06F 7/00
(52) U.S. Cl. ........................................ 700/213; 700/121
(58) Field of Search .......................... 700/213, 99, 100, 700/121; 414/935

(56) References Cited

U.S. PATENT DOCUMENTS 5,751,582 A * 5/1998 Saxena et al. ......... 364/468.16
5,975,740 A * 11/1999 Lin et al. ................ 364/468.05

* cited by examiner

Primary Examiner—Christopher P. Ellis
Assistant Examiner—Khoi H. Tran (57) ABSTRACT

Methods and systems for managing test wafers an automated material handling system are provided. Test material is classified into a plurality of classes. A time profile for each class of test material for a time period is determined and the test material is placed into cassettes based on the determined time profile for each class. When a request to pick up a particular group of a test material class is received, a cassette is identifying for picking up the particular group based on the contents of the cassette.

22 Claims, 5 Drawing Sheets

MANAGING TEST MATERIAL IN AN AUTOMATED MATERIAL HANDLING SYSTEM

FIELD OF THE INVENTION

The present invention generally relates to automated material handling systems and, more particularly, to systems and methods for managing test material in automated material handling systems.

BACKGROUND OF THE INVENTION

Automated material handling systems are used in a variety of industries to move various materials from one location to a another location. Semiconductor fabrication facilities, in particular, commonly employ automated material handling systems for fabricating integrated circuits on semiconductor wafers.

A conventional semiconductor fabrication plant typically includes multiple fabrication areas or bays interconnected by a path, such as a conveyor belt. Each bay generally includes the requisite fabrication tools (interconnected by a subpath) to process semiconductor wafers for a particular purpose, such as photolithography, chemical-mechanical polishing, or chemical vapor deposition, for example. Material stockers or stocking tools generally lie about the plant and store semiconductor wafers waiting to be processed. The wafers are usually stored in cassettes each of which typically hold up to 25 wafers. Each material stocker typically services two or more bays and can hold hundreds of cassettes.

The semiconductor fabrication plant, including the bays, material stockers and the interconnecting path, typically operates under control of a distributed computer system running a factory management program, such as Work-Stream Open sold by Consilium, Inc. In this environment, the automated process specification. Manufacturers commonly employ non-production wafers or test wafers to facilitate the fabrication of production wafers. These test wafers may be used for a number of different purposes. For instance, qualification test wafers may be used by a tool (e.g., a deposition chamber) prior to processing production wafers with the tool to calibrate the tool and/or to ensure the operability of the tool. As another example, dummy wafers may be used to fill slots within a carrier or chamber where a "full" state is required for proper processing.

As a result of the large number of wafers being fabricated and the numerous process steps performed on each wafer, a large number of test wafers and thus a large number of cassettes are typically employed during fabrication. As a facility can only operate with a finite number of cassettes, test cassettes take capacity away from production cassettes, thereby reducing the number of production wafers which may be fabricated over a period of time. Throughput is further diminished as a result of the manner in which the cassettes are occupied. In a typical facility, each cassette typically holds a single type of test wafer, the cassette being designated for a particular procedure (e.g., qualification, particle count, etc.). In addition, on average a typically cassette holds 15 or less test wafers, far less than its capacity. This adds to the number of test cassettes and further contributes to throughput inefficiencies.

Semiconductor manufactures compete in a highly competitive and capital-intensive industry. A state-of-the-art semiconductor fabrication plant typically includes hundreds of different fabrication tools and can cost $1 billion or more. New plants can also become obsolete relatively quickly as the dimensions of semiconductor devices decrease. Consequently, to generate higher revenues, semiconductor manufactures continually seek to increase to the throughput and yield of semiconductor wafers and find systems and techniques which increase either of these parameters to be highly desirable.

SUMMARY OF THE INVENTION

The present invention generally provides techniques for managing test material (e.g., test wafers) in automated material handling systems. These techniques may, for example, significantly reduce the capacity of test cassettes and/or reduce the number of test cassettes needed for a given number of products. This can increase the throughput of material through these systems.

In accordance with an embodiment of the invention, test material is classified into a plurality of classes. A time profile for each class of test material for a production period is determined. The test material is then placed into cassettes based on the determined time profiles for each class.

The above summary of the present invention is not intended to describe each illustrated embodiment or every implementation of the present invention. The figures in the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention generally provides techniques for managing test material in an automated material handling system. The invention is particularly suited for managing test wafers in a fabrication facility for fabricating semiconductor wafers. While the present invention is not so limited, a better understanding of the invention will be found by reading the detailed description and exemplary embodiments which follow. Moreover, while the exemplary embodiment relate to semiconductor facilities using test wafers, it should be appreciated that the invention is not so limited.

Figure 1:
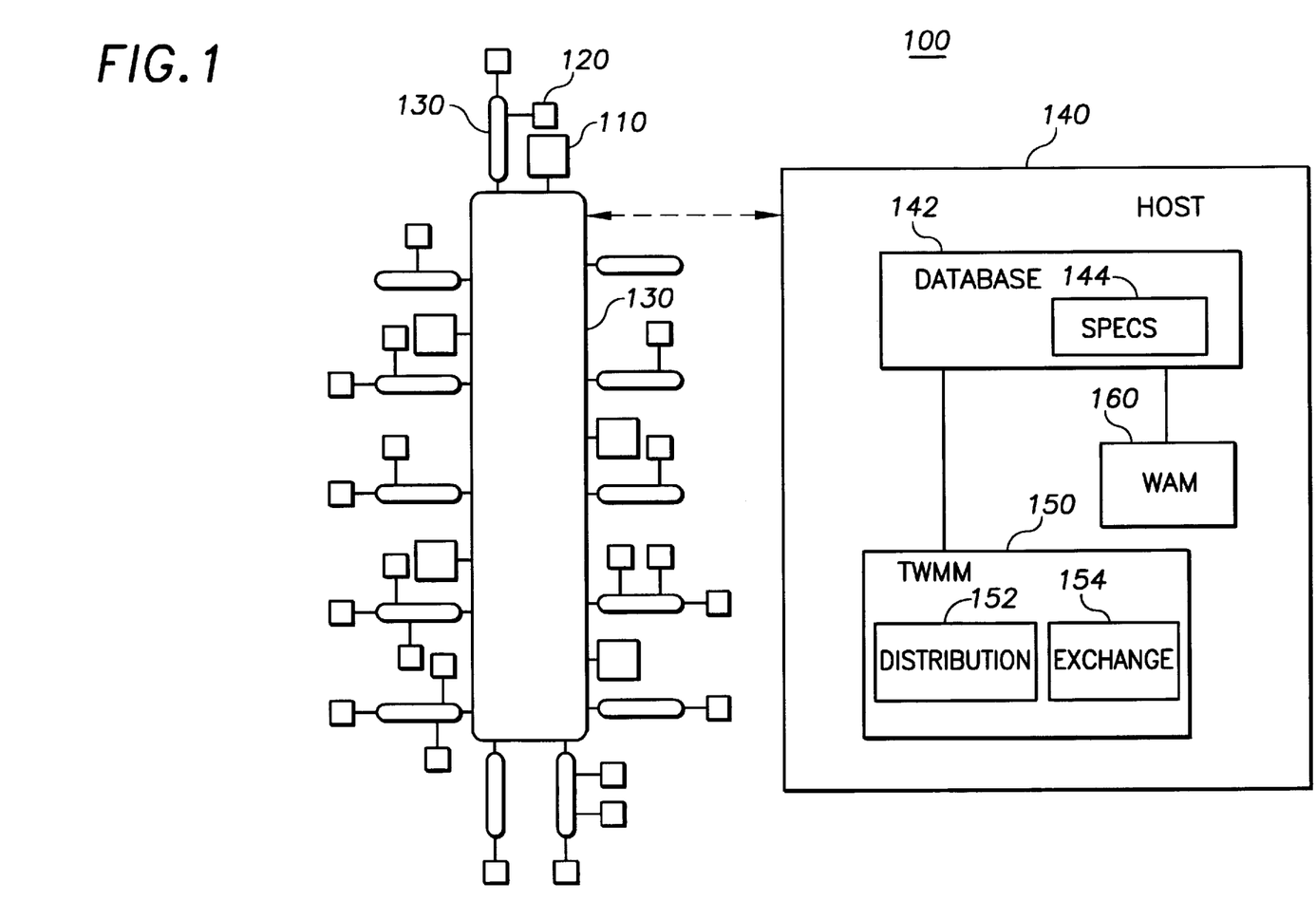
FIG. 1 illustrates an exemplary semiconductor fabrication facility in accordance with one embodiment of the invention.

FIG. 1 illustrates an exemplary semiconductor fabrication facility in accordance with an illustrative embodiment of the invention. The semiconductor fabrication facility 100 generally includes multiple stocking tools or stockers 110 and multiple fabrication tools 120 and an automated material handling system for moving material (e.g., wafers) between the tools. The example automated material handling system includes one or more paths 130 interconnecting the tools and a host system 140 which controls the movement of material within the facility. The host system 140 typically is a distributed computer system running a factory management program, such as WorkStream Open. The fabrication and stocker tools and path(s) each typically include or are associated with a computer system which locally controls the operation of the tool or path and which communicates with the host system 140.

A number of different fabrication tools may be provided for fabricating wafers. While not exhaustive, such fabrication tools include, deposition chambers, polishing tools, photolithography tools, for example. The facility further includes a number of wafers, including test wafers and production wafers, and a number of cassettes for storing wafers processed in the facility. During processing, production wafers are typically divided into lots of one or more wafers. Test wafers are typically divided into groups depending on the use for each test wafer. Each cassette and wafer or wafer lot typically includes an identification tag, such as a bar code, which may be read by each tool and/or path for identifying the cassette and wafer or wafer lot.

The term production wafer is used herein to describe semiconductor wafers on which actual products (e.g., integrated circuits) are being formed. The term test wafer is used herein to generally refer to non-production wafers used during fabrication. Such non-production or test wafers may, for example, be used for calibration, filling, particle counting, etc. In addition, the term cassette is not to be read narrowly. Rather, it is intended that the term cassette extend to cover any type of container used to hold material in an automated material handling system.

The host system 140 typically includes a memory management, such as a database 142, for storing information pertaining to the fabrication process. The database 142 may reside on the host system 140 as shown or, alternatively, may reside on a separate system. The database 142 typically stores the number of wafer lots being started at a particular time, the time of each wafer start, and the associated process sequence specification 144 for each wafer start. Each process sequence specification 144 details a series of process steps under which a wafer lot undergoes during fabrication. Typically, a number of different process sequence specifications are in operation at a given time. The host system 140 accesses the specification(s) 144 to manage the flow of wafers within the facility. As should be appreciated, a given wafer lot undergoes a number of events during its fabrication sequence. Such events include, for example, dopant implants, various dielectric and metal deposition steps, polishing steps, storage in stockers, transfers between cassettes and so forth.

The host system 140 may further include a wafer attribute module (WAM) 160 which manages attributes of wafers as they move through their fabrication sequence. WAM 160 generally stores and updates attributes of wafers as they undergo events during fabrication. The attributes for each wafer are typically stored in a memory arrangement, such as the database 142, and maintained by WAM 160. A more detailed discussion of wafer attribute management may be found in co-pending application Ser. No. 09/193,349, entitled "Managing a Semiconductor Fabrication Facility Using Wafer Lot and Cassette Attributes," filed Nov. 17, 1998, the contents of which are herein incorporated by reference. Cassette attributes may also be maintained to logically zone cassettes.

The host system 140 further includes a test wafer management (TWM) module 150 for managing test wafers in the facility. The test wafer management module 150, in the exemplary embodiment, includes a distribution module 152, having access to the process sequence specifications 142, for handling distribution of test wafers in cassettes and an exchange module 154 which handles test wafer exchanges between cassettes and the various tools around the facility. Additional details of test wafer distribution and exchange control will be provided below.

The host system 140 and modules 150 and 160 may be implemented in a number of different manners. The implementation of the modules as a subcomponent of the host system 140 is provided by way of illustration only. The modules 150 and 160 may, alternatively, be implemented as stand alone modules which interface with the host system 140, for example. A number of other implementations techniques will be readily understood by one skilled in the art upon reading the present description.

Test wafer attributes can vary depending on the fabrication processes employed as well as the desired number of wafer classes. For purpose of illustration and not of limitation, the wafer attributes listed in Table 1 may be used in conjunction with the example embodiment. The type of attributes and definition thereof are intended as examples and can vary from application to application.

TABLE 1

| Attribute | Description |
| --- | --- |
| Particle Count Wafer | Wafer used for collecting particles in a tool during a specified time. |
| Qualification Wafer | Wafer used to qualify a tool for a process. Wafer typically has some structure necessary to test a tool over a range of operation. |
| Monitor Wafer | Wafer which travels with and typically undergoes similar processing as an associated product lot. Wafer may be pulled for inspection. |
| Conditioning Wafer | Wafer used to condition a process tool, e.g., to assure that no reaction to a product lot occurs before a run is started. |
| Dummy Wafer | Wafer used to fill a location in a cassette or tool. |
| Metrology Wafer | Wafer used as a reference for comparison to actual production outputs. For example, a metrology wafer may include a particular line width, contact size or metal depth. |
| Associated Tool | Identifies a particular tool which is associated with a wafer. |
| Associated Process | Identifies a particular process which is associated with a wafer. |
| Associated Product Lot | Identifies a particular product lot which is associated with a wafer. |
| Process Route | Identifies a particular route, series of process steps, which is associated with a wafer. |
| New/Used | Identifies whether a wafer is new or has been used. |
| Clean/Dirty | Identifies whether a wafer is clean or dirty. |

TABLE 1-continued

| Attribute | Description |
|---|---|
| Contaminated/Noncontaminated | Identifies whether a wafer is contaminated (e.g., exposed to copper or cobalt) or not. |

Based on these attributes, the wafers can be grouped into a variety of classes or types. For example, one test wafer type may be a new dummy wafer associated with a particular process. As should be appreciated, additional attributes may be used to further classify test wafers. The type of wafer used for a particular processing step depends on the processing step.

Figure 2:
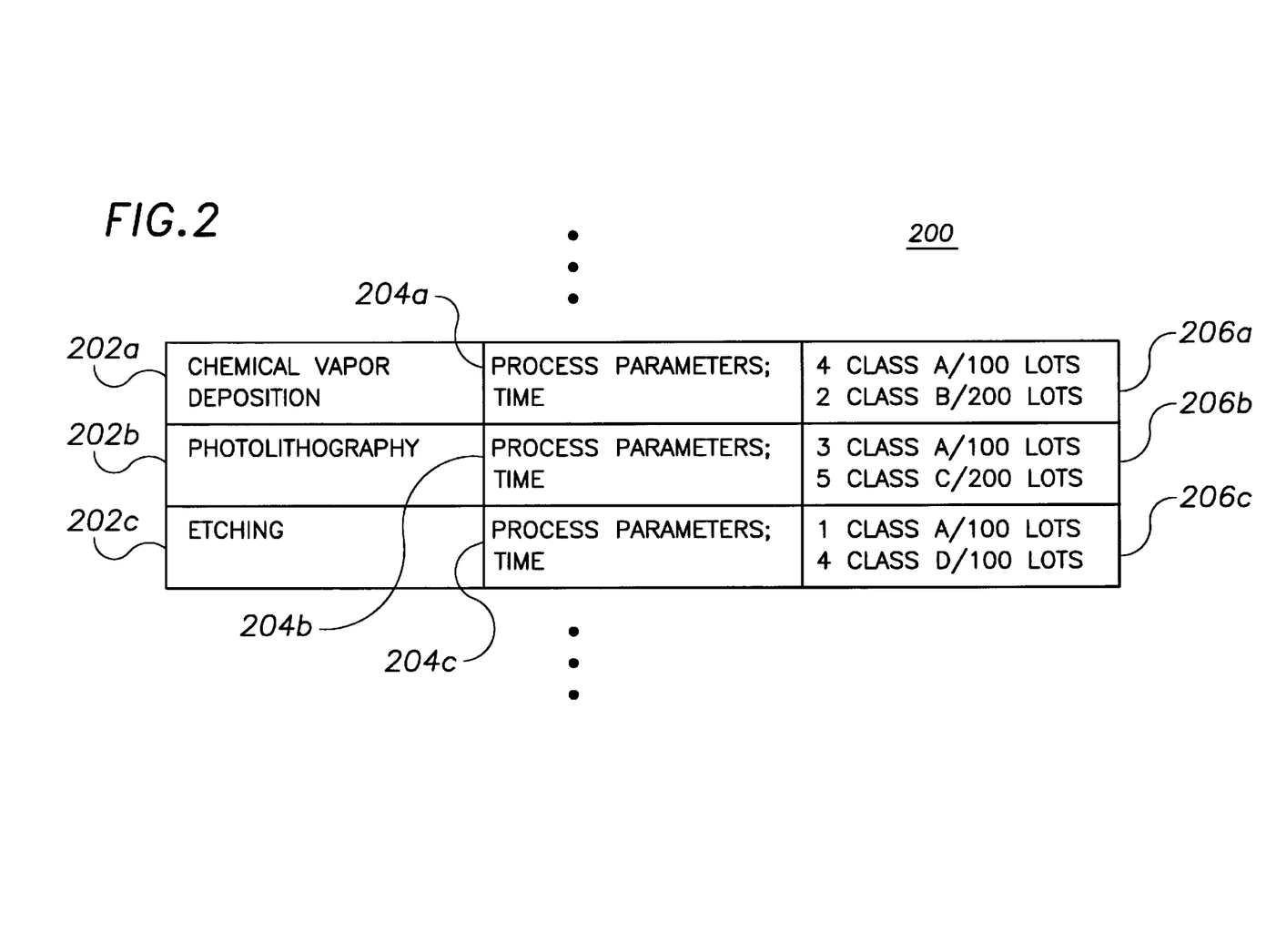
FIG. 2 illustrates an exemplary portion of a process sequence specification in accordance with an embodiment of the invention.

FIG. 2 illustrates a portion of an exemplary process sequence specification 200. As will be appreciated, the process sequence specification 200 if shown in its entirety would include a much larger number of process steps. The exemplary specification 200 includes a number of process step specifications 202a–202c. Each process step specification 202a–c includes information 204a–c for carrying out the process step. This information includes, inter alia, the tool(s) used, the processing parameters for each tool, and the time for completing the process step. The time may be provide as a flow rate (e.g., X production wafers/hour). The flow rate parameter is typically predetermined based on prior history of the process step, for example. Each process step specification further includes a field 206a–c identifying the number and class of test wafers, if any, which are needed to perform the process step. The field 206a–c may identify the number of each class of test wafer for a given number of production wafer lots, for example. As discussed below, the distribution module 152 can access the specification(s) running over a period of time to determine a distribution of test wafers over time.

Figure 3:
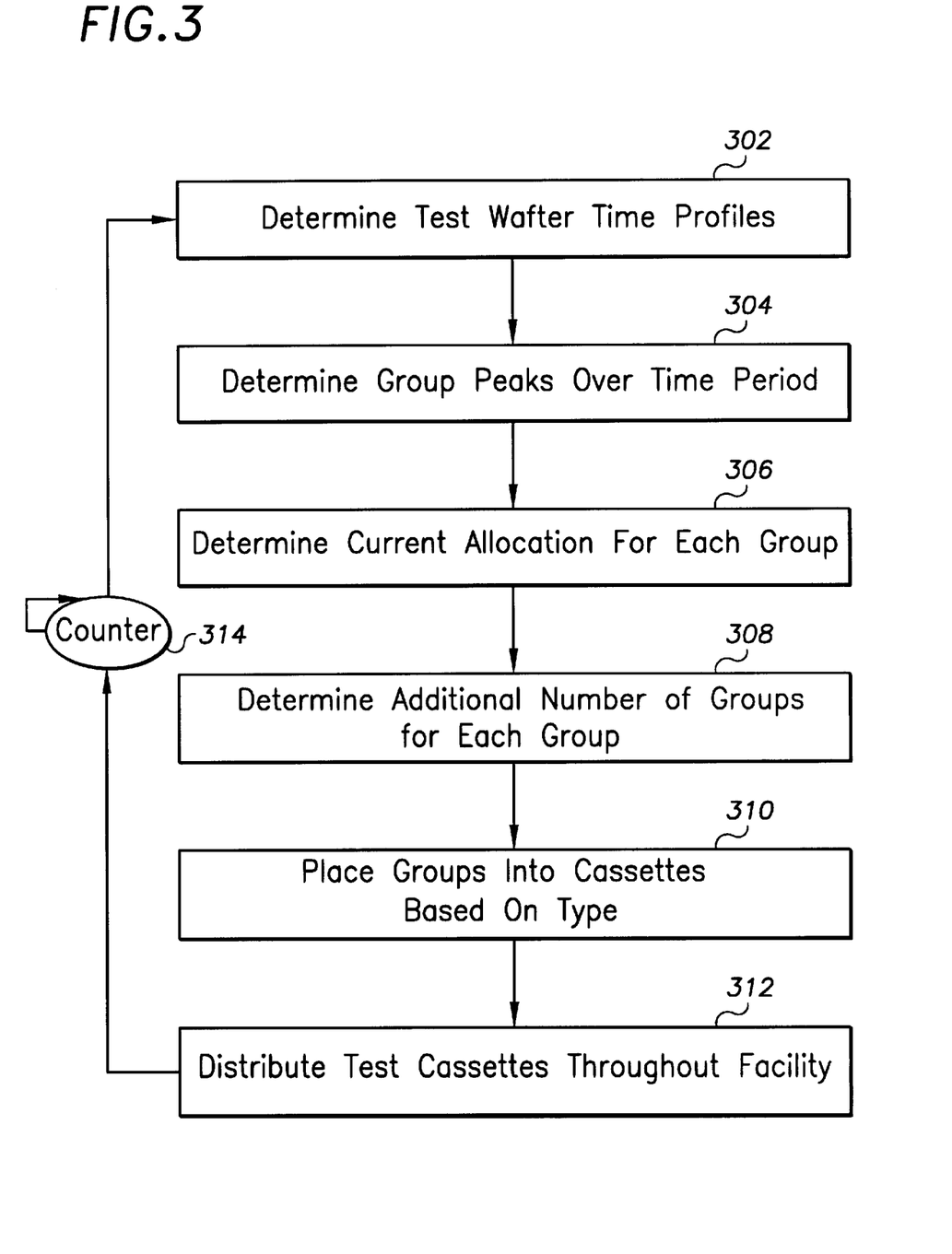
FIG. 3 illustrates an exemplary process in accordance with an embodiment of the invention.

FIG. 3 illustrates an exemplary process for arranging test wafers into cassettes. This process will, by way of example, be described with reference to the distribution module 152 discussed above. In accordance with this example process, the distribution module determines a time profile of test wafers as indicated at block 302. The distribution module typically determines the number of production wafers being started under a particular fabrication sequence and the timing of the wafer starts over a time period. This may be done by querying the database 142. As will be appreciated, groups of production wafers are typically started at different time intervals. Using the number of production wafer starts, the timing thereof, and the corresponding process sequence specifications the distribution module estimates the time at which each step during each fabrication sequence will be carried out. Using these time estimates, the distribution module determines a test wafer time profile, including the total number and distribution by group, for each particular class of test wafers. The test wafer time profiles may be determined through the end of each process sequence specification or for predetermined time period (e.g., 3 months). The distribution module may determine the total number and distribution of each particular class of test wafers at intervals, for example, of one hour. The determination may take into account changes in the attributes of a particular set of test wafers which occur during process. These changes may change the class of the set of test wafers.

Figure 4:
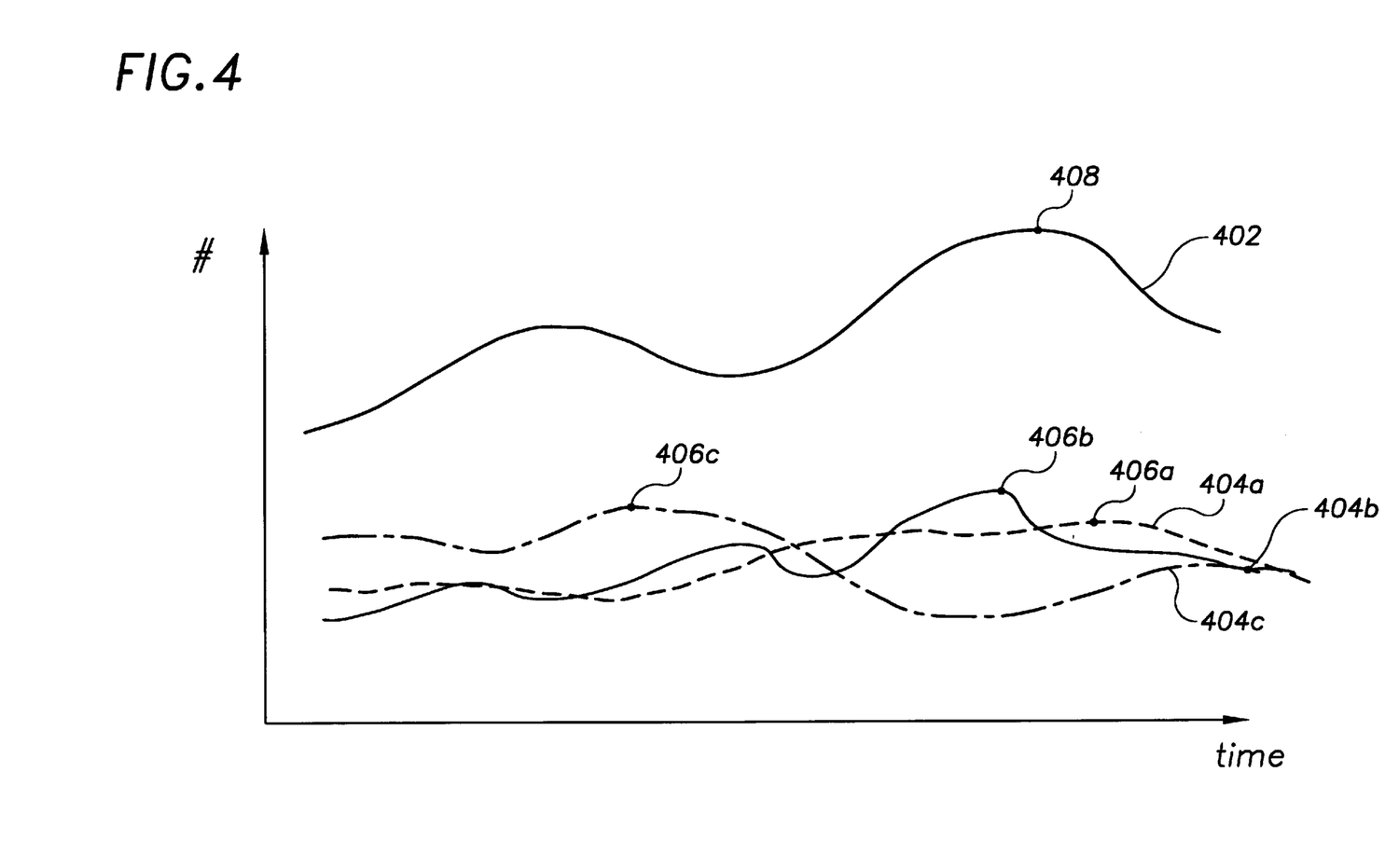
FIG. 4 illustrates an exemplary test wafer profile in accordance with an embodiment of the invention.

FIG. 4 illustrates an exemplary time profile of a test wafer class. Plot 402 illustrates the total number of test wafers of the particular class over time. Plots 404–c illustrate group distributions for the class of test wafers. Specifically, plot 404a illustrates the number of groups containing 3 test wafers of the particular class, plot 404b illustrates the number of groups containing 2 such test wafers, and plot 404c illustrates the number of groups containing 1 such test wafer. As can be seen, the peaks 406a–c of the groupings may not coincide with the peak 408 of the class as a whole. In the example embodiment, the distribution module typically determines a similar time profile for each class of test wafers.

Based on the determined distributions, peaks for each test wafer class group over a predetermined time interval are determined, as indicated at block 304. The time interval can vary depending on the application. For example, the distribution module may use a time period of one month. The current allocation of each test wafer class group may be determined, as indicated at block 306. This step may include the distribution module querying a database containing information regarding the cassettes operating in the facility to determine the number of each test wafer class group currently being used. These numbers can vary depending on the test wafers present in the facility.

The additional number of each test wafer class group is then determined as indicated at block 308. This typically includes determining the difference, for each test wafer class group, between the peak of the group and current allocation for the group. Where the peak falls below the present allocation, the corresponding number of groups may be pulled from the facility. Where the peak exceeds the current allocation, additional test wafers may be provided from a source and grouped together for the particular type.

The additional groups of test wafers are then placed into cassettes, as indicated at block 310. This step may be carried out after all the additional test wafer groups are determined or may be performed after each additional test wafer group is received. Optionally, this may include retrieving test wafer groups previously distributed and rearranging these groups with the newly created groups. The test wafer groups are placed into cassettes such that multiple different groups are carried in each cassette. An example cassette may include a group of 4 wafers of a class A, a group of 2 wafers from class A, a group of 5 wafers from a class B, a group of 5 wafers from a class C, a group of 4 wafers from class C, and a group of 5 wafers from class A, for example.

The distribution module typically aims to minimize the number of test cassettes for the determined number of test wafers needed and to minimize duplication of the same group in the same cassette. In some cases, both results cannot be achieved, in which case the distribution module may be set to give preference to one of the conditions, i.e. either minimizing the number of cassettes or preventing duplication. The non-preferenced condition may then be optimized given the constraints. For example, where 1000 test wafers cannot be placed in 40 cassettes without duplication, the test wafers may be placed in the forty cassettes with minimal duplication or may be placed in the minimal number of cassettes over 40 without duplication.

The test wafer cassettes are distributed in the facility, as indicated at block 312. This may be done after filling each cassette or after all the test wafer cassettes have been filled.

Control may return to block 302 where test wafer time profiles for a subsequent period of time are determined. This may be done periodically as indicated by counter 314 or at the start of each new production run, for example. The process then loops through blocks 302–314 for the subsequent time period. When fabrication is occurring, the test wafer time profiles are typically determined by extrapolating from the present state of fabrication in each fabrication sequence using the timing information (e.g., flow rates) set forth in each process steps specification. In this manner, the distribution module takes into account process steps of a process sequence fabrication which have already been performed and will be performed by the start of the subsequent time period.

Using the above process, test wafer groups may be distributed among various cassettes and the average capacity of the cassettes as a whole may be increased. Cassette capacities for test wafers averaging greater than 80% (e.g., 20 out of 25) can be achieved. This reduces the number of test wafer cassettes used in the facility and increases the throughput of the facility as compared to conventional semiconductor fabrication facilities. Moreover, by distributing the groups, a suitable number of same type of group is distributed across the facility, thus increasing the efficiency when requesting a particular group.

Figure 5:
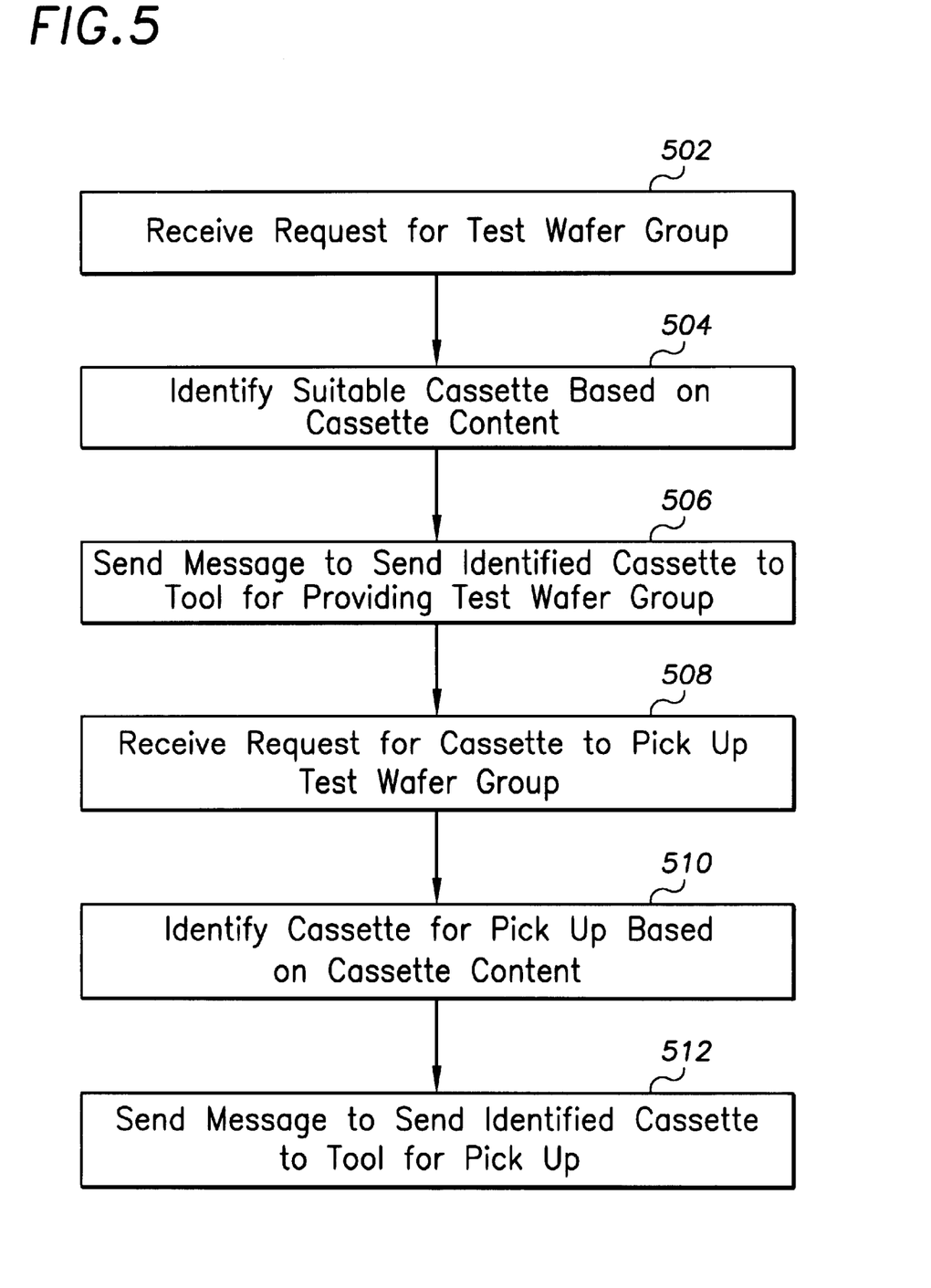
FIG. 5 illustrates an exemplary process in accordance with yet another embodiment of the invention.

FIG. 5 illustrates an exemplary process for handling test wafer exchanges in a fabrication facility. This process may, for example, be carried out by an exchange module as discussed above. At block 502, the exchange module receives a request for a particular group of test wafer(s) of a specific type. The request for a particular test wafer group is typically generated by the host system after receiving acknowledgment of the completion of a particular process step from a tool and reading the sequence specification to determine the next process step. The request is then typically forwarded to the exchange module.

The exchange module identifies a particular cassette carrying the requisite group to be sent to the tool. The exchange module may query a database of cassette information to determine the best suitable cassette based on a number of factors. For example, the exchange module may select the particular cassette based on the location of the cassette and/or the current mixture of groups within the cassette. For example, preferential weighting may be given to cassettes closer to the tool in need of the test wafer group and/or cassettes carrying duplicates of the requisite test wafer group.

The exchange module then sends a command requesting that the identified cassette be sent to the particular tool, as indicated at block 506. The host system typically manages the movement of the identified cassette to the tool. The tool then receives the cassette, retrieves the particular group and returns the cassette to the handling system. As should be appreciated, the cassette returns with additional capacity for storing more test wafers. The tool then operates on the test wafer group according to the process step specification. Attributes of the test wafers in the group may be updated based on the processing performed thereon using a wafer attribute module, as noted above.

The exchange module next receives a request to pick up the test wafer group processed by the tool, as indicated at block 508. The tool typically sends the pick up request to the host system, after completing its processing. In response, the exchange module identifies the most appropriate cassette for picking up the test wafer group, as indicated at block 510. To do so, the exchange module may query a database of cassette information to determine the most appropriate cassette based on a number of factors. For example, the exchange module may give preferential weighting to cassette location and/or the contents of the cassette. Cassettes having more capacity may be provided additional weighting and cassettes not containing the group being picked up may be given additional weighting. Additionally, cassettes closer to the tool location may be provided additional weighting. Based on these weightings, a cassette may be identified.

After identifying the particular cassette, a command is then sent to send the identified cassette to the tool picking up the test wafer group, as indicated at block 514. The exchange module typically sends this commend via the host system.

As noted above, the present invention is applicable to a number of techniques for managing test material in an automated material handling system based. Accordingly, the present invention should not be considered limited to the particular examples described above, but rather should be understood to cover all aspects of the invention as fairly set out in the attached claims. For instance, while the management of test wafers in an automated material handling systems of a semiconductor facility is illustrated, the invention extends to cover other the management of different types of test material in different environments. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of managing test material in an automated material handling systems, comprising:
   classifying test material into a plurality of classes;
   determining a time profile for each class of test material for a production period; and
   placing the test material into cassettes based on the determined time profiles for each class.

2. The method of claim 1, wherein determining the test material time profile includes determining a peak number for each group of a specific test material class for the production period.

3. The method of claim 1, wherein determining the test material time profile includes reading a plurality of process sequence specifications.

4. The method of claim 3, wherein each specification includes a sequence of process steps, each process step identifying one or more groups of a particular class of test material for a predetermined number of products.

5. The method of claim 2, wherein placing includes placing multiple different test material groups in the same cassette.

6. The method of claim 1, further including repeating the determination of a test material time profiles for a subsequent production period and adjusting distribution of test material in the system based on the determined time profiles for the subsequent process period.

7. The method of claim 1, wherein the test material includes semiconductor wafers.

8. The method of claim 1, further including;
   receiving a request to pick up a particular group of a test material class; and
   identifying a cassette for picking up the particular group based on the contents of the cassette.

9. The method of claim 8, wherein identifying the cassette includes identifying the cassette based on the number of groups similar to the particular group contained by the cassette.

10. The method of claim 9, wherein identifying the cassette includes selecting a cassette containing the smallest number of groups similar to the particular group.

11. A system for managing test material in an automated material handling systems, comprising:
    a memory arrangement for storing one or more process sequence specifications and for storing wafer attributes classifying test material into a plurality of classes;

a test wafer management module, coupled to the memory arrangement, for determining a time profile for each class of test material for a production period based on the one or more process sequence specifications and placing the test material into cassettes based on the determined time profiles for each class.

12. The system of claim 11, wherein the test wafer management module determines the test material time profile by determining a peak number for each group of a specific test material class for the production period.

13. The system of claim 11, wherein each specification includes a sequence of process steps, each process step identifying one or more groups of a particular class of test material for a predetermined number of products.

14. The system of claim 12, wherein the test wafer management module places by placing multiple different test material groups in the same cassette.

15. The system of claim 11, the test wafer management module repeats the determination of a test material time profiles for a subsequent production period and adjusts distribution of test material in the system based on the determined time profiles for the subsequent process period.

16. The system of claim 11, wherein the test material includes semiconductor wafers.

17. A system for managing test material in an automated material handling systems, comprising:

means for classifying test material into a plurality of classes;

means for determining a time profile for each class of test material for a production period; and means for placing the test material into cassettes based on the determined time profiles for each class.

18. The system of claim 17, wherein the means for determining the test material time profile reads a plurality of process sequence specifications.

19. The system of claim 17, wherein the means for determining the test material time profile determines a peak number for each group of a specific test material class for the production period.

20. The system of claim 19, wherein means for placing includes means for placing multiple different test material groups in the same cassette.

21. The system of claim 17, further including means for determining repeats the determination of a test material time profiles for a subsequent production period and adjusts distribution of test material in the system based on the determined time profiles for the subsequent process period.

22. The system of claim 17, wherein the test material includes semiconductor wafers.

* * * * *

UNITED STATES PATENT AND TRADEMARK OFFICE
CERTIFICATE OF CORRECTION

PATENT NO. : 6,338,005 B1
DATED : January 8, 2002
INVENTOR(S) : Conboy et al.

It is certified that error appears in the above-identified patent and that said Letters Patent is hereby corrected as shown below:

<u>Title page,</u>
Item [57], ABSTRACT,
Line 1, please insert -- in -- after "wafers".
Line 8, "identifying" should read -- identified --.

<u>Drawings,</u>
FIG. 3, In box 302, "Wafter" should read -- Wafer --.

<u>Column 1,</u>
Line 14, after "to", please delete "a".
Line 58, "typically" should read -- typical --.
Line 62, "manufactures" should read -- manufacturers --.

<u>Column 2,</u>
Line 2, "manufactures" should read -- manufacturers --.
Line 2, after " increase", please delete "to".
Line 65, "relate" should read -- relates --.

<u>Column 5,</u>
Line 26, "provide" should read -- provided --.
Line 66, "404-c" should read -- 404$a$-$c$ --.

<u>Column 7,</u>
Line 2, "steps" should read -- step --.

<u>Column 8,</u>
Line 3, "514" should read -- 512 --.
Line 4, "commend" should read -- command --.
Line 7, after "system", please delete "based".
Line 13, "systems" should read -- system --.
Line 14, after "cover", please delete "other".
Line 24, "systems" should read -- system --.
Line 64, "systems" should read -- system --.

UNITED STATES PATENT AND TRADEMARK OFFICE
CERTIFICATE OF CORRECTION

PATENT NO. : 6,338,005 B1
DATED : January 8, 2002
INVENTOR(S) : Conboy et al.

It is certified that error appears in the above-identified patent and that said Letters Patent is hereby corrected as shown below:

Column 9,
Line 26, "systems" should read -- system --.

Column 10,
Line 20, "profiles" should read -- profile --.

Signed and Sealed this

Eleventh Day of June, 2002

*Attest:*

*Attesting Officer*

JAMES E. ROGAN
*Director of the United States Patent and Trademark Office*